C. L. KESSLER.
PRINTING PRESS BRAKE.
APPLICATION FILED OCT. 26, 1921.
1,437,734.
Patented Dec. 5, 1922.
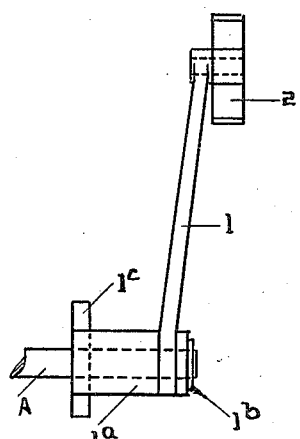
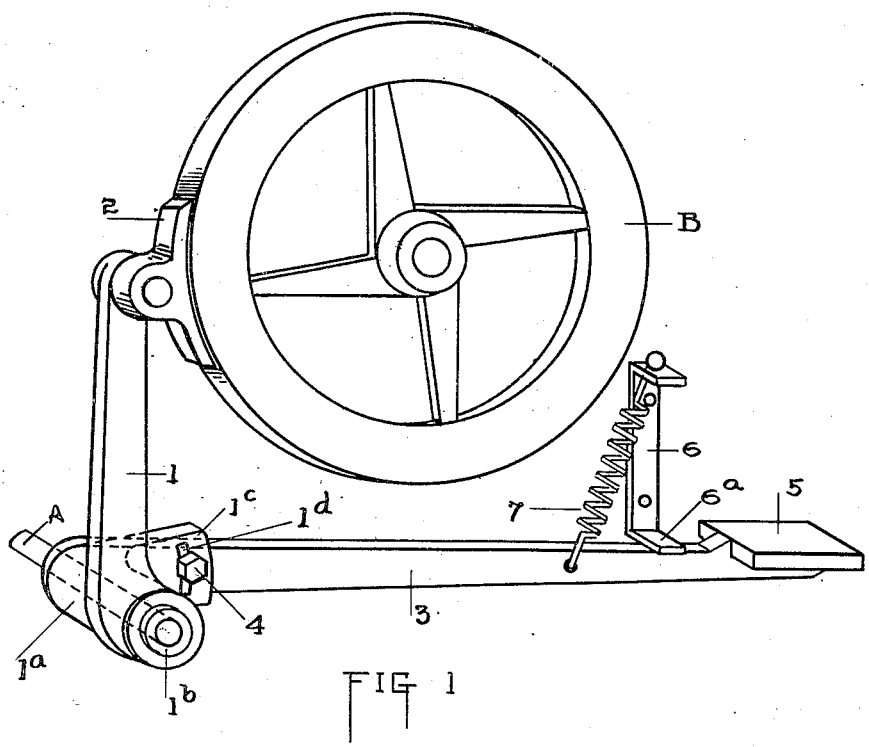
INVENTOR.
Charles L Kessler
BY A. B. Bowman
ATTORNEY Patented Dec. 5, 1922.

1,437,734

UNITED STATES PATENT OFFICE.

CHARLES L. KESSLER, OF SAN DIEGO, CALIFORNIA.

PRINTING-PRESS BRAKE.

Application filed October 26, 1921. Serial No. 510,628.

*To all whom it may concern:*

Be it known that CHARLES L. KESSLER is a citizen of the United States, residing at San Diego, in the county of San Diego and State of California, has invented a certain new and useful Printing-Press Brake, of which the following is a specification.

My invention relates to a brake, particularly adapted for use in connection with printing presses and the objects of my invention are: first, to provide a brake of this class in which the foot lever is positioned so that it is readily accessible to the press operator; second, to provide a brake of this class which is applicable for use in connection with printing presses now in use without changing the press structure; third, to provide a brake of this class which is adjustable; fourth, to provide a brake of this class which is easy to operate, easy to install and efficient in its action.

With these and other objects in view as will appear hereinafter my invention consists of certain novel features of construction, combination and arrangement of parts and portions as will be hereinafter described in detail and particularly set forth in the appended claims reference being had to the accompanying drawings, and to the characters of reference thereon which form a part of this application, in which:

Figure 1, is a perspective view of my brake shown in connection with the wheel of the press and in position for operation; Fig. 2, is an end elevational view of the brake structure, shown in its relation to the press.

Similar characters of reference refer to similar parts and portions throughout the views of the drawings.

The brake arm 1, brake shoe 2, brake lever 3, adjusting screw 4, pedal member 5, bracket 6, and spring 7, constitute the principal parts and portions of my brake mechanism.

The brake arm member 1, consists of a hub portion $1^a$, which is revolubly mounted upon the shaft A and is supported in position thereon by means of a collar $1^b$. From the hub portion $1^a$ adjacent the collar $1^b$ extends the arm member 1 on an angle as shown best in Fig. 2 so that its extended end over hangs the extended end of the shaft A, and forms the crank for the brake shoe 2. On the extended end of this arm 1 is provided an extended portion at an obtuse angle from the arm 1, and parallel with the shaft A, and this extended portion is journaled in the brake shoe 2, which is adapted to rest against the face of the fly wheel B, of the printing press. Extending from this hub portion $1^a$, on an angle to the arm 1 and spaced therefrom is a lug $1^c$ which is provided with an elongated radial hole $1^d$ therein adapted for the set screw 4 to move therein. The lever 3, is provided with a hole in its one end adapted to fit over the shaft A, and the set screw 4, is screwed therein thus providing for the adjustment of the lever 3, relatively to the brake arm 1, thus providing adjustment for the brake. Secured on the extended end of the lever 3, is a foot pedal member 5, adapted to facilitate its being operated by foot pressure. Secured on the frame of the printing press to one side and below the fly wheel B, is a bracket 6, which is provided with a horizontal extended portion $6^a$, which serves as a stop for the upward movement of the brake lever 3, permitting it sufficient movement to release the brake shoe 2 from the fly wheel B. The upper end of this bracket 6, is also provided with a right angle turn to which is secured the one end of the tension spring 7, and its other end connects with the brake lever 3, which provides yieldable means tending to release the brake, when the foot pressure on the pedal 5, is relieved.

Though I have shown and described a particular construction, combination and arrangement of parts and portions, I do not wish to be limited to this particular construction, combination and arrangement, but desire to include in the purview of my invention, the construction, combination and arrangement substantially as set forth in the appended claims.

It is obvious that with this construction, there is provided a brake particularly adapted for printing presses in which the operating parts are so positioned that they are readily accessible to the operator and properly positioned for easy brake action; that the structure is applicable for use with the conventional printing press; that the brake is readily adjustable for taking up the wear of the shoe as well as for easy operation; that the structure as a whole is very simple, and economical of construction and efficient in its action.

Having thus described my invention what I claim as new and desire to secure by Letters Patent is:

1. A brake apparatus of the class described, including a brake arm revolubly mounted at one end, a brake shoe positioned on the extended end of said arm, a brake lever adjustably secured to the hub of said arm, a brake spring, a bracket positioned contiguous to said brake lever which serves the double functions of regulating the movement of the brake lever and supporting the brake spring.

2. A brake apparatus for printing presses, including a brake arm, off set on an angle from the hub, a brake shoe mounted on the extended end of said arm, a lug provided with an elongated hole extending from said hub at an angle to said arm, a brake shaft, a lever with one end mounted over the shaft and provided with a set screw adapted to fit in the elongated hole in said lug whereby the brake lever may be adjusted relatively to the brake arm, and yieldable means tending to hold the brake arm in a certain position.

3. A brake apparatus for printing presses including, a brake arm, off set on an angle from the hub, a brake shoe mounted on the extended end of said arm, a lug provided with an elongated hole extending from said hub at an angle to said arm, a brake shaft, a lever with one end mounted over the shaft and provided with a set screw adapted to fit in the elongated hole in said lug whereby the brake lever may be adjusted relatively to the brake arm, and yieldable means tending to hold the brake arm in a certain position and means adapted to engage said brake lever and serve as a stop for the movement of the same.

In testimony whereof, I have hereunto set my hand at San Diego, California, this 18th day of October, 1921.

CHARLES L. KESSLER.